(12) United States Patent
Harman

(10) Patent No.: US 6,496,598 B1
(45) Date of Patent: Dec. 17, 2002

(54) IMAGE PROCESSING METHOD AND APPARATUS

(75) Inventor: Philip Victor Harman, Scarborough (AU)

(73) Assignee: Dynamic Digital Depth Research Pty. Ltd., Bentley (AU)

(*) Notice: Subject to any disclaimer, the term of this patent is extended or adjusted under 35 U.S.C. 154(b) by 0 days.

(21) Appl. No.: 09/516,326

(22) Filed: Mar. 1, 2000

Related U.S. Application Data

(63) Continuation of application No. PCT/AU98/00716, filed on Sep. 2, 1998.

(51) Int. Cl.⁷ .................................................. G06K 9/00
(52) U.S. Cl. ........................ 382/154; 382/103; 382/107; 382/232
(58) Field of Search ................................ 382/100, 107, 382/154, 232, 236, 103; 348/42, 47, 51, 413; 345/419, 433, 473; 359/462, 464

(56) References Cited

U.S. PATENT DOCUMENTS

| 4,925,294 A | 5/1990 | Geshwind et al. |
| 5,510,832 A | 4/1996 | Garcia |
| 5,682,437 A | 10/1997 | Okino et al. |
| 5,689,312 A | * 11/1997 | Kim ........................... 348/699 |
| 5,717,415 A | 2/1998 | Iue et al. |
| 5,748,199 A | * 5/1998 | Palm ........................... 345/473 |
| 5,760,933 A | 6/1998 | Aritake et al. |
| 5,777,666 A | 7/1998 | Tanase et al. |
| 5,969,766 A | * 10/1999 | Kim ........................... 348/413 |

FOREIGN PATENT DOCUMENTS

| EP | 0264964 A2 | 4/1988 |
| EP | 0704823 A | 4/1996 |
| EP | 0717373 A2 | 6/1996 |
| WO | WO96/41311 A | 12/1996 |
| WO | WO97/24000 A | 7/1997 |

* cited by examiner

*Primary Examiner*—Joseph Mancuso
*Assistant Examiner*—Vikkrami Bali
(74) *Attorney, Agent, or Firm*—Banner & Witcoff, Ltd.

(57) ABSTRACT

An image conversion system for converting monoscopic images for viewing in three dimensions including: an input means adapted to receive the monoscopic images; a preliminary analysis means to determine if there is any continuity between a first image and a second image of the monoscopic image sequence; a secondary analysis means for receiving monoscopic images which have a continuity, and analyzing the images to determine the speed and direction of motion, and the depth, size and position of objects; a first processing means for processing the monoscopic images based on data received from the preliminary analysis means or the secondary analysis means; a second processing means capable of further processing images received from the first processing means; a transmission means capable of transferring the processed images to a stereoscopic display system.

65 Claims, 8 Drawing Sheets

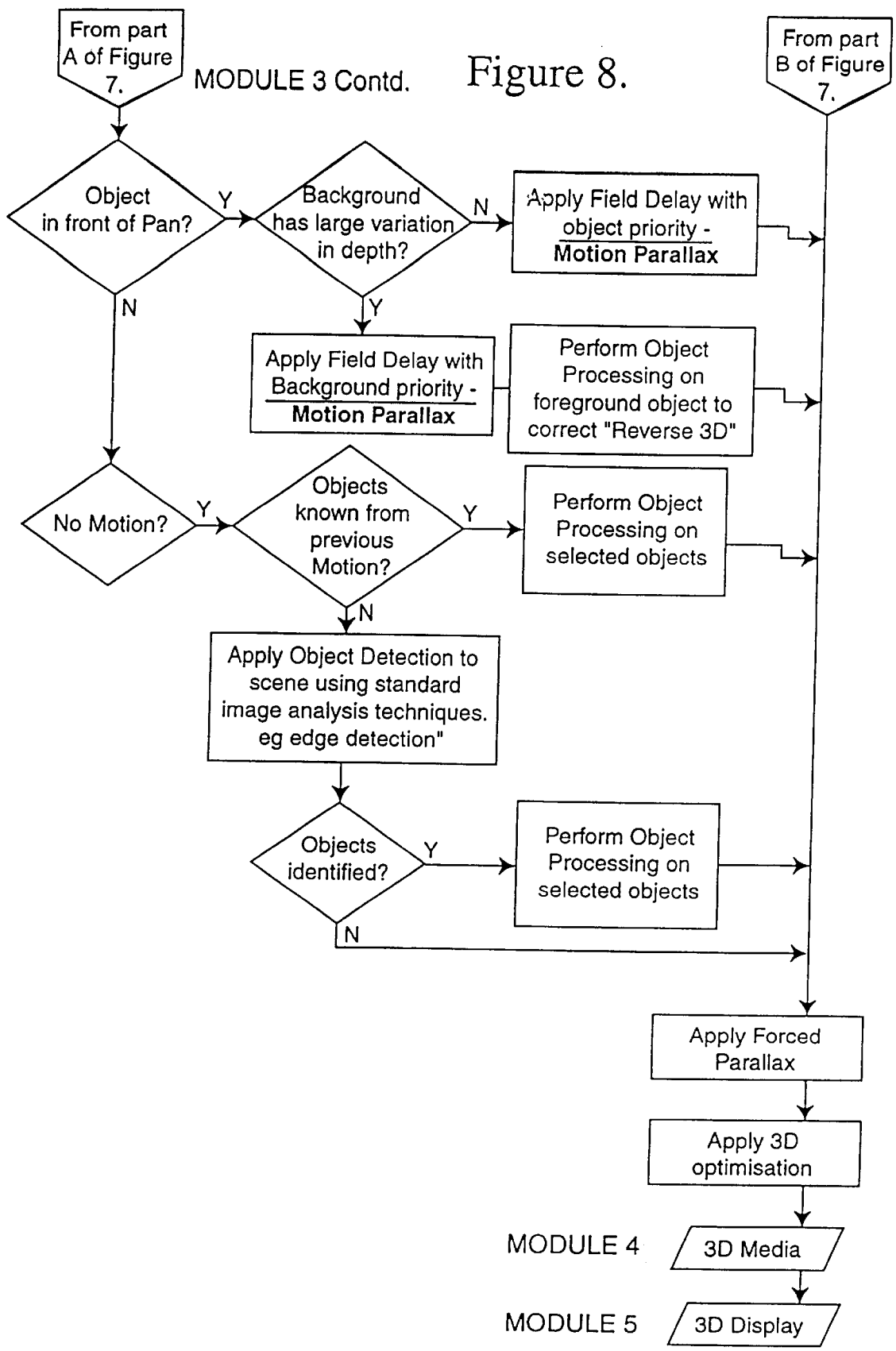

IMAGE PROCESSING METHOD AND APPARATUS

This application is a continuation of International Application Serial No. PCT/AU98/00716 filed Sep. 2, 1998, the teachings of which are incorporated herein by reference, which in turn claims priority from Australian Serial No. PO 8944 filed Sep. 2, 1997.

FIELD OF INVENTION

The present invention relates generally to stereoscopic image systems, and in particular to the synthesis of stereoscopic image pairs from monoscopic images for stereoscopic display. The present invention may also be directed towards a five module method for producing stereoscopic images, that digitises a monoscopic source, analyses it for motion, generates the stereoscopic image pairs, optimises the stereoscopic effect, transmits or stores them and then enables them to be displayed on a stereoscopic display device.

BACKGROUND ART

The advent of stereoscopic or three dimensional (3D) display systems which create a more realistic image for the viewer than conventional monoscopic or two dimensional (2D) display systems, requires that stereoscopic images be available to be seen on the 3D display systems. In this regard there exists many monoscopic image sources, for example existing 2D films or videos, which could be manipulated to product stereoscopic images for viewing on a stereoscopic display device.

Preexisting methods to convert such monoscopic images for stereoscopic viewing do not product acceptable results. Other attempts in film and video have used techniques to duplicate the stereoscopic depth cue of "Motion Parallax". These involved producing a delay for the images presented to the trailing eye when laterals, left or right, motion is present in the images. Other attempts have used 'Lateral Shifting' of the images to the left and right eyes to provide depth perception.

However, these two techniques are limited and generally only suit specific applications. For example, the Motion Parallax technique is only good for scenes with left or right motion and is of limited value for the stereoscopic enhancement of still scenes. The Lateral Shifting technique will only give an overall depth effect to a scene and not allow different objects at varying depths to be perceived at the depths where they occur. Even the combination of these two techniques will only give a limited stereoscope effect for most 2D films or videos.

Some existing approaches demonstrate limitations of these techniques. When an image has vertical motion and some lateral motion and a delay is provided to the image presented to the trailing eye then the result is often a large vertical disparity between the left and right views such that the images are uncomfortable to view. Scenes with contra motion, such as objects moving left and right in the same scene are also uncomfortable to view. Certain embodiments of these methods define that when objects of varying depths are present in an image there is a distinct 'card board cut-out' appearance of the objects with distinct depth modules rather than a smooth transition of objects from foreground to background.

In all these approaches no successful attempt has been made to develop a system or method to suit all image sequences or to resolve the problem of viewer discomfort or to optimise the stereoscopic effect for each viewer or display device.

OBJECTS OF THE INVENTION

There is therefore a need for a system with improved methods of converting monoscopic images into stereoscopic image pairs and a system for providing inproved stereoscopic images to a viewer.

An object of the present invention is to provide such a system with improved methods.

SUMMARY OF INVENTION

In order to address the problems noted above the present invention provides in one aspect a method for converting monoscopic images for viewing in three dimensions including the steps of:

receiving said monoscopic images;

analysing said monoscopic images to determine characteristics of the images;

processing said monoscopic images based on the determined image characteristics;

outputting the processed images to suitable storage and/or stereoscopic display systems.

wherein analysing of said monoscopic images to determine the motion includes the steps of:

dividing each image into a plurality of blocks, wherein corresponding blocks on an adjacent image are offset horizontally and/or vertically; and comparing each said block with said corresponding blocks to find the minimum mean square error and thereby the motion of the block.

An image conversion system for converting monoscopic images for viewing in three dimensions including:

an input means adapted to receive monoscopic images;

a preliminary analysis means to determine if there is any continuity between a first image and a second image of the monoscopic image sequence;

a secondary analysis means for receiving monoscopic images which have a continuity, and analysing the images to determine at least one of the speed and direction of motion, or the depth, size and position of objects, wherein analysing of said monoscopic images to determine the motion includes the steps of: dividing each image into a plurality of blocks, wherein corresponding blocks on an adjacent image are offset horizontally and/or vertically, and comparing each said block with said corresponding blocks to find the minimum mean square error and thereby the motion of the block;

a first processing means for processing the monoscopic images based on data received from the preliminary analysis means and/or the secondary analysis means.

Ideally, the input means also includes a means to capture and digitise the monoscopic images.

Preferably the image analysis means is capable of determining the speed and direction of motion, the depth, size and position of objects and background within an image.

In a further aspect the present invention provides a method of optimising the stereoscopic image to further improve the stereoscopic effect and this process is generally applied prior to transmission, storage and display.

In yet a further aspect the present invention provides a method of improving stereoscopic image pairs by adding a viewer reference point to the image.

In still yet a further aspect the present invention provides a method of analysing monoscopic images for conversion to stereoscopic image pairs including the steps of: scaling each image into a plurality of regions; comparing each region of a first image with corresponding and adjacent regions of a second image to determine the nature of movement between said first image and said second image.

Preferably a motion vector is defined for each image based on a comparison of the nature of motion detected with predefined motion categories ranging from no motion to a complete scene change.

In yet a further aspect the present invention provides a system for converting monoscopic images for viewing in three dimensions including:

- a first module adapted to receive a monoscopic image;
- a second module adapted to receive the monoscopic image and analyse the monoscopic image to create image date, wherein analysing of said monoscopic image to determine the motion includes the steps of: dividing each image into a plurality of blocks, wherein corresponding blocks on an adjacent image are offset horizontally and/or vertically, and comparing each said block with said corresponding blocks to find the minimum mean square error and thereby the motion of the block;
- a third module adapted to create stereoscopic image pairs from the monoscopic image using at least one predetermined technique selected as a function of the image data;
- a fourth module adapted to transfer the stereoscopic image pairs to a stereoscopic display means;
- a fifth module consisting of a stereoscopic display means.

Preferably the first module is further adapted to convert any analogue images into a digital image. Also, the second module is preferably adapted to detect any objects in a scene and make a determination as to the speed and direction of any such motion. Conveniently, the image may be compressed prior to any such analysis.

Preferably the third module further includes an optimisation stage to further enhance the stereoscopic image pairs prior to transmitting the stereoscopic image pairs to the stereoscopic display means. Conveniently, the fourth module may also include a storage means for storing the stereoscopic image pairs for display on the stereoscopic display means at a later time.

ADVANTAGES

It will be appreciated that the process of the present invention can be suspended at any stage and stored for continuation at a later time or transmitted for continuation at another location if required.

The present invention provides a conversion technology with a number of unique advantages including:

1) Realtime or Non-realtime Conversion

The ability to convert monoscopic images to stereoscopic image pairs can be performed in realtime or non-realtime. Operator intervention may be applied to manually manipulate the images. An example of this is in the conversion of films or videos where every sequence may be tested and optimised for its stereoscopic effect by an operator.

2) Techniques Include Stereoscopic Enhancement

The present invention utilises a plurality of techniques to further enhance the basic techniques of motion parallax and lateral shifting (forced parallax) to generate stereoscopic image pairs. These techniques include but are not limited to the use of object analysis, tagging, tracking and morphing, parallax zones, reference points, movement synthesis and parallax modulation techniques.

3) Detection and Correction of Reverse 3D

Reverse 3D is ideally detected as part of the 3D Generation process by analysing the motion characteristics of an image. Correction techniques may then employed to minimise Reverse 3D so as to minimise viewer discomfort.

4) Usage in all Applications—Includes Transmission and Storage

The present invention discloses a technique applicable to a broad range of applications and describes a complete process for applying the stereoscopic conversion process to monoscopic applications. The present invention

INTRODUCTION

Humans see by a complex combination of physiological and psychological processes involving the eyes and the brain. Visual perception involves the use of short and long term memory to be able to interpret visual information with known and experienced reality as defined by our senses. For instance, according to the Cartesian laws on space and perspective the further an object moves away from the viewer the smaller it gets. In other words, the brain expects that if an object is large it is close to the viewer and if it is small it is some distance off. This is a learned process based on knowing the size of the object in the first place. Other monoscopic or minor depth cues that can be represented in visual information are for example shadows, defocussing, texture, light, atmosphere.

These depth cues are used to great advantage in the production of 'Perspective 3D' video games and computer graphics. However, the problem with these techniques in achieving a stereoscopic effect is that the perceived depth cannot be quantified: it is an illusion of displaying 2D objects in a 2D environment. Such displays do not look real as they do not show a stereoscopic image because the views to both eyes are identical.

DEPTH CUES

Stereoscopic images are an attempt to recreate real world visuals, and require much more visual information than 'Perspective 3D' images so that depth can be quantified. The stereoscopic or major depth cues provide this additional data so that a person's visual perception can be stimulated in three dimensions. These major depth cues are described as follows:

Retinal Disparity—refers to the fact that both eyes see a slightly different view. This can easily be demonstrated by holding an object in front of a person's face and focussing on the background. Once the eyes have focused on the background it will appear as though there are actually two objects in front of the face. Disparity is the horizontal distance between the corresponding lefts and right image points of superimposed retinal images. While Parallax is the actual spatial displacement between the viewed images.

2) Motion Parallax—Those objects that are closer to the viewer will describes on the one hand techniques for 3D Generation where both the image processing equipment and stereoscopic display equipment are located substantially at the same location. While on the other hand techniques are defined for generation of the stereoscopic image pairs at one location and their transmission, storage and subsequent display at a remote location.

5) Can be Used With Any Stereoscopic Display Device

The present invention accommodates any stereoscopic display device and ideally has built in adjustment facilities. The 3D Generation process can also take into account the type of display device in order to optimise the stereoscopic effect.

BRIEF DESCRIPTION OF FIGURES

The invention will be more fully understood from the following description of a preferred embodiment of the conversion method and integrated system and as illustrated in the accompanying figures. It is, however, to be appreciated that the present invention is not limited to the described embodiment.

FIG. 8 shows the second part of a flow diagram of Module 3 and Module 4 (3D Media—Transmission & Storage) and Module 5 (3D Display).

DETAILED DESCRIPTION

The present invention aims to provide a viewer with a stereoscopic image that uses the full visual perception capabilities of an individual. Therefore it is necessary to provide the depth cues the brain requires to interpret such images. appear to move faster even if they are travelling at the same speed as more distant objects. Therefore relative motion is a minor depth cue. But the major stereoscopic depth cue of lateral motion is the creation of motion parallax. With motion in an image moving from right to left, the right eye is the leading eye while the left eye becomes the trailing eye with its image being delayed. This delay is a normal function of our visual perception mechanism. For left to right motion the right eye becomes the trailing eye. The effect of this delay is to create retinal disparity (two different views to the eyes), which is perceived as binocular parallax thus providing the stereoscopic cue known as Motion Parallax.

3) Accommodation—The eye brings an object into sharp focus by either compressing the eye lens (more convex shape for close object) or expanding the eye lens (less convex shape for far object) through neuromotor activity. The amount and type of neuromotor activity is a stereoscopic cue for depth in an image.

4) Convergence—Is the response of the eye's neuromotor system that brings images of an object into alignment with the central visual area of the eyes such that only one object is seen. For example, when a finger held at arms length is viewed by both eyes and slowly brought towards the face, the eyes turn inwards (converge) indicating that the finger is getting closer. That is, the depth to the finger is decreasing.

The eyes convergence response is physiologically linked to the accommodation mechanism in normal vision. In stereoscopic viewing, when viewers are not accommodated to the 'Fixation Plane' (that to which the eyes are converged), they may experience discomfort. The 'Plane of Fixation' is normally the screen plane.

OVERVIEW—5 MODULE APPROACH

The present invention describes a system that is capable of taking any monoscopic input and converting it to an improved stereoscopic output. For ease of description this complete system can be broken down into a number of independent modules or processes, namely:

MODULE 1—Monoscopic Image Input (typically video input)

MODULE 2—Image Analysis

MODULE 3—3D Generation

MODULE 4—3D Media (Transmission or Storage)

MODULE 5—3D Display

Figure 1:
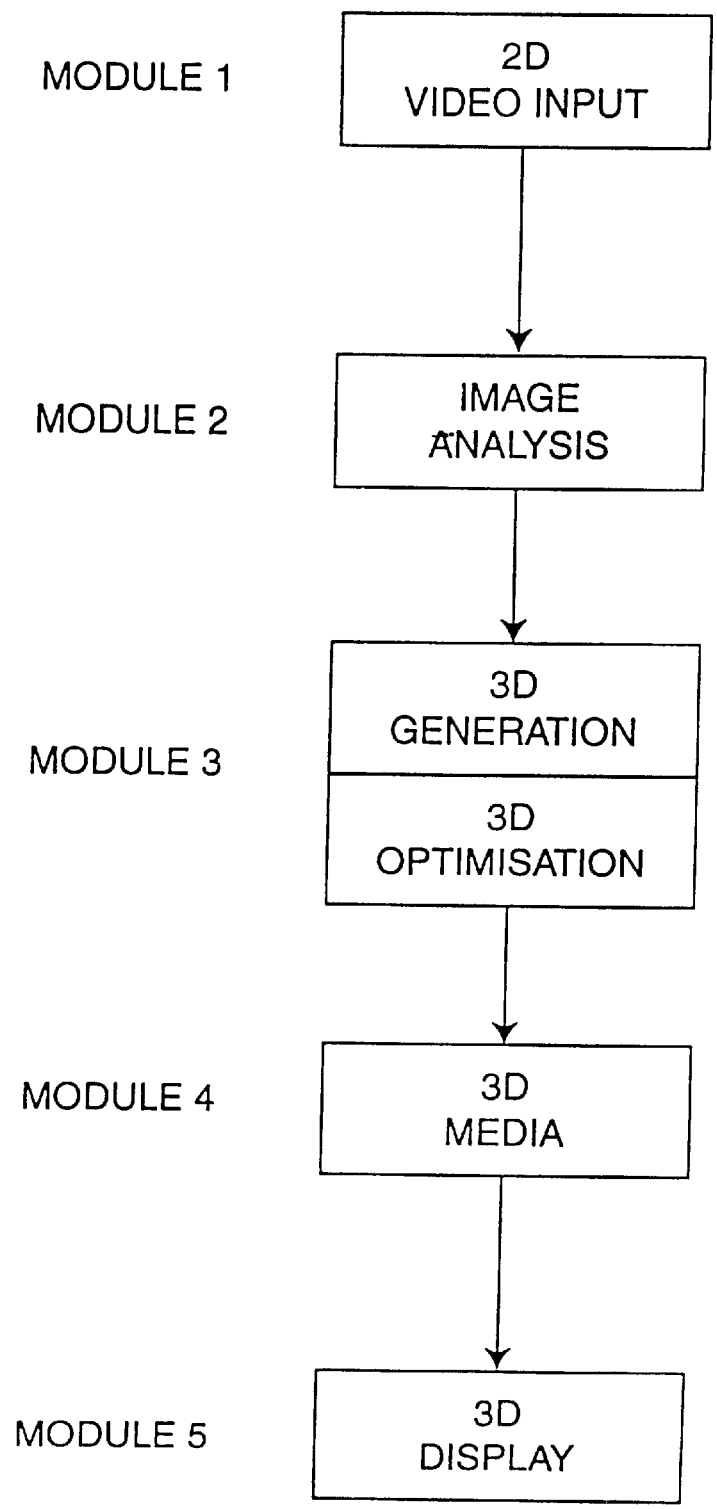
FIG. 1 shows the breakdown into modules of a complete system utilising the present invention.

FIG. 1 shows this top down approach to the stereoscopic conversion process, where video or some other monoscopic image source is input, images are analysed, stereoscopic image pairs are generated, transmitted and/or stored and then displayed on a stereoscopic display. Each Module describes an independent process of the complete system from monoscopic image input to stereoscopic display. However, it will be appreciated that the various modules may be operated independently.

APPLICATIONS

Generally, all five modules are used, from monoscopic image input to display for a particular application. For example, this system may be used in theatres or cinemas. In such an application the 2D video input can take the form of analogue or digital to the video sources. These sources would then be analysed to determine speed and direction of any motion. The processes would then work in either real-time or non real-time in order to create the 3D images. This can be further optimised through the use of borders, parallax modification, reverse 3D analysis, shading, and/or texturing. The 3D images may then be stored or transmitted to a 3D display, including shutterglasses, polarising glasses or an autostereoscopic display.

This system may also be adapted for use with cable or pay-TV systems. In this application the 2D video input could be video from a VTR, a laser disc, or some other digital source. Again the 3D Generation and/or optimisation can proceed in either real time or non real time. The 3D media module would conveniently take the form of transmission via cable or satellite to enable 3D display on TV, video projector, or an auto stereoscopic display.

The system may also be used with video arcade games, in multimedia, or with terrestrial or network TV. Depending on the application the 2D video input module may obtain source monoscopic images from a games processor, video from a laser disc, video from VTR, video from a network, or some other digital storage device or digital source or telecine process. The 3D Generation can take place in real time or non real time, and be generated by computer at a central conversion site, in a user's computer, on a central processor, or some other image processor. The stereoscopic images can then be stored on video or other digital storage device, prior to distribution to cinemas or transmission by a local network. These stereoscopic images may also be transmitted to video projectors via a local transmission, or alternatively via VHF/UHF facilities or satellite.

The 3D display is dependent on the application required, and can take the form of an auto stereoscopic display device, a video projector with polarising glasses, a local monitor with shutter-glasses, or a set-top box with suitable viewing glasses.

Single & Multiple Processors

Figure 2:
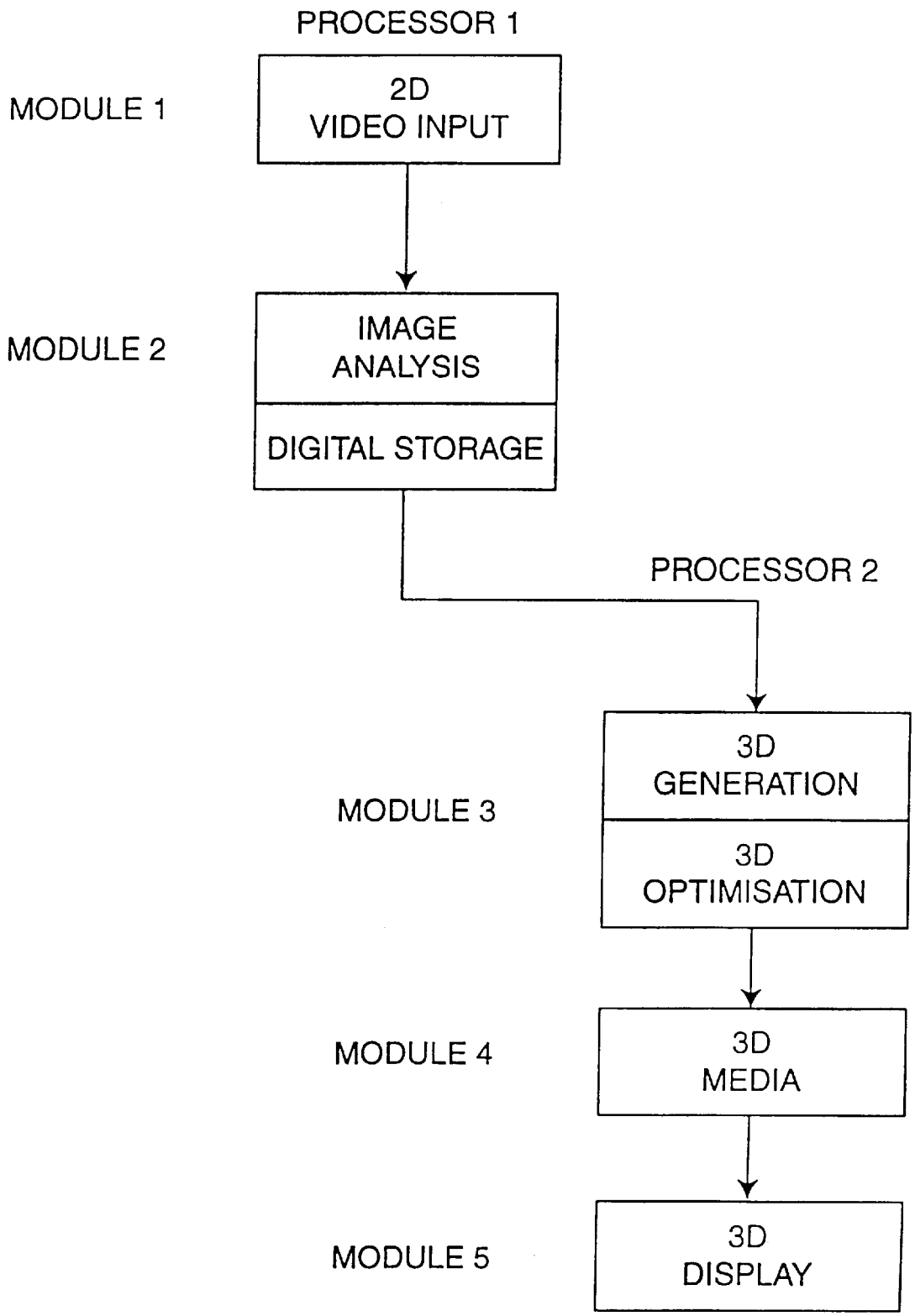
FIG. 2 shows a possible use of multiple processors with a complete system utilising the present invention.
Figure 3:
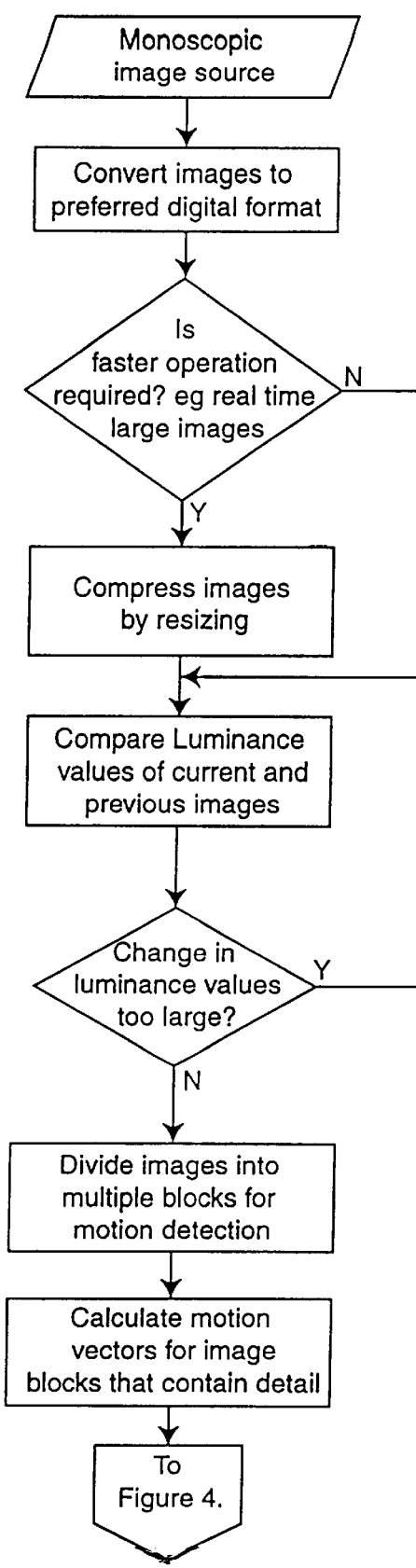
FIG. 3 shows a flow diagram of Module 1 (Video Digitising) and the first part of Module 2 (Image Analysis).
Figure 4:
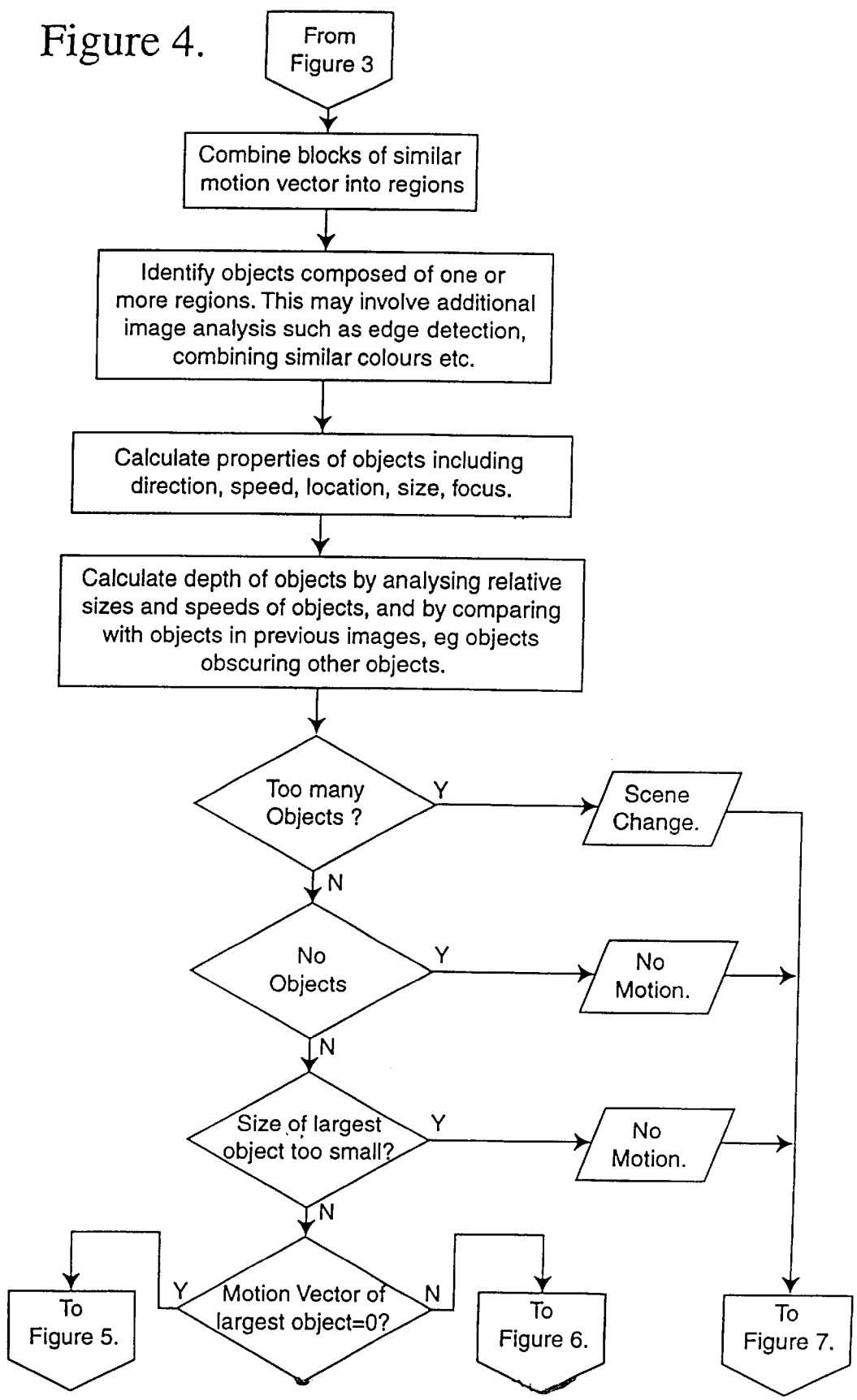
FIG. 4 shows the second part of a flow diagram of Module 2.
Figure 5:
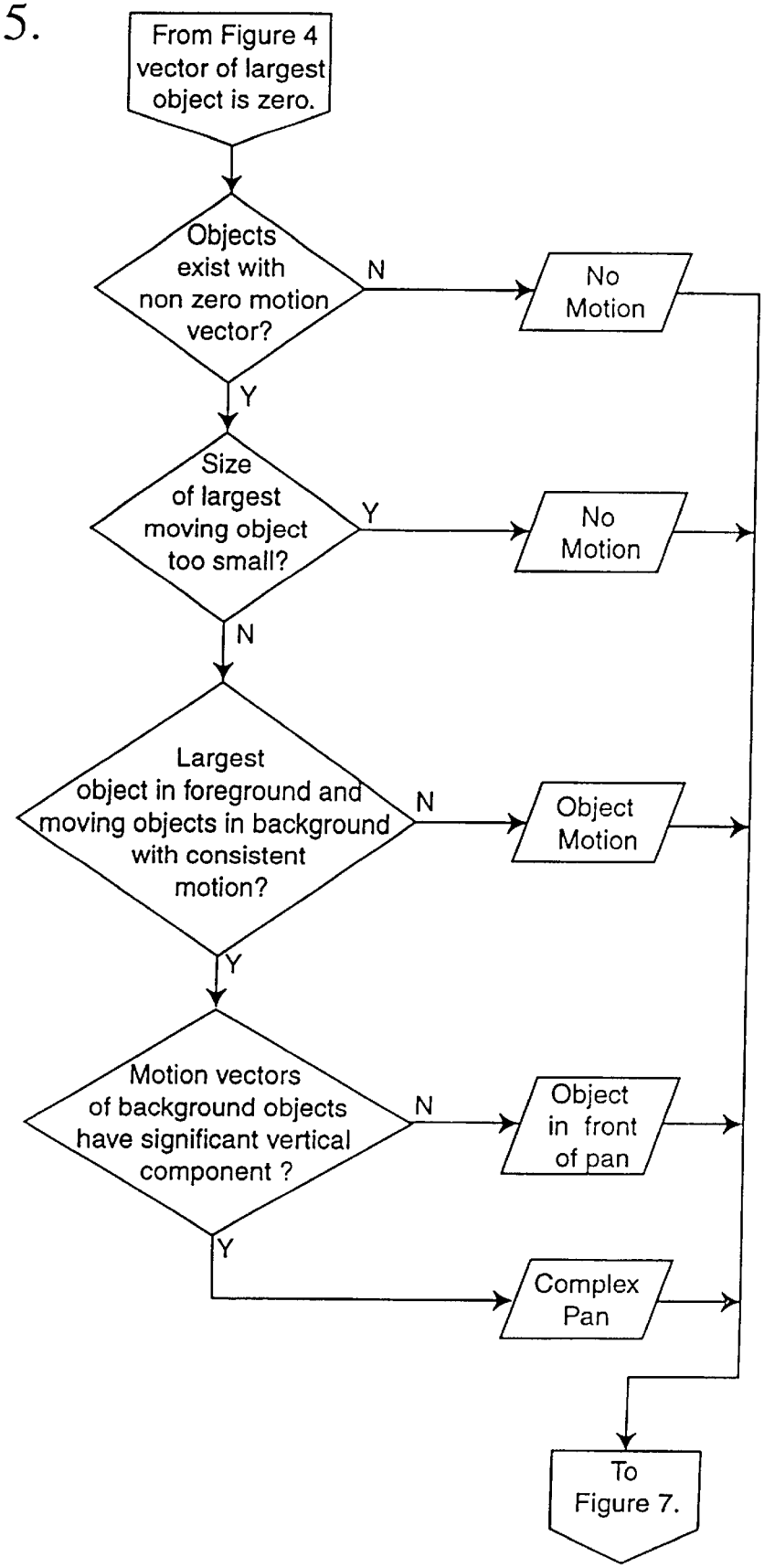
FIG. 5 shows the third part of a flow diagram of Module 2.
Figure 6:
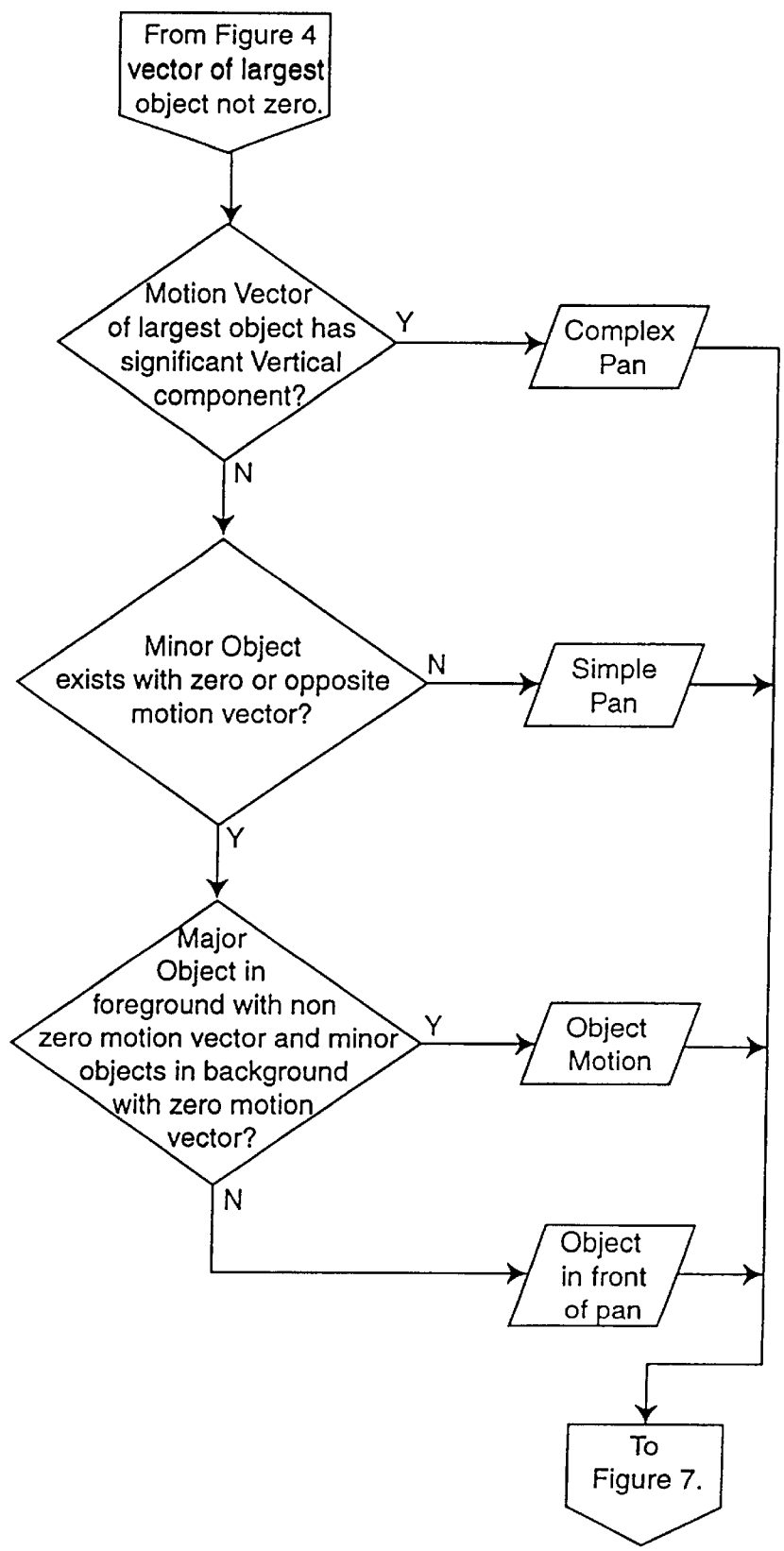
FIG. 6 shows the fourth part of a flow diagram of Module 2.
Figure 7:
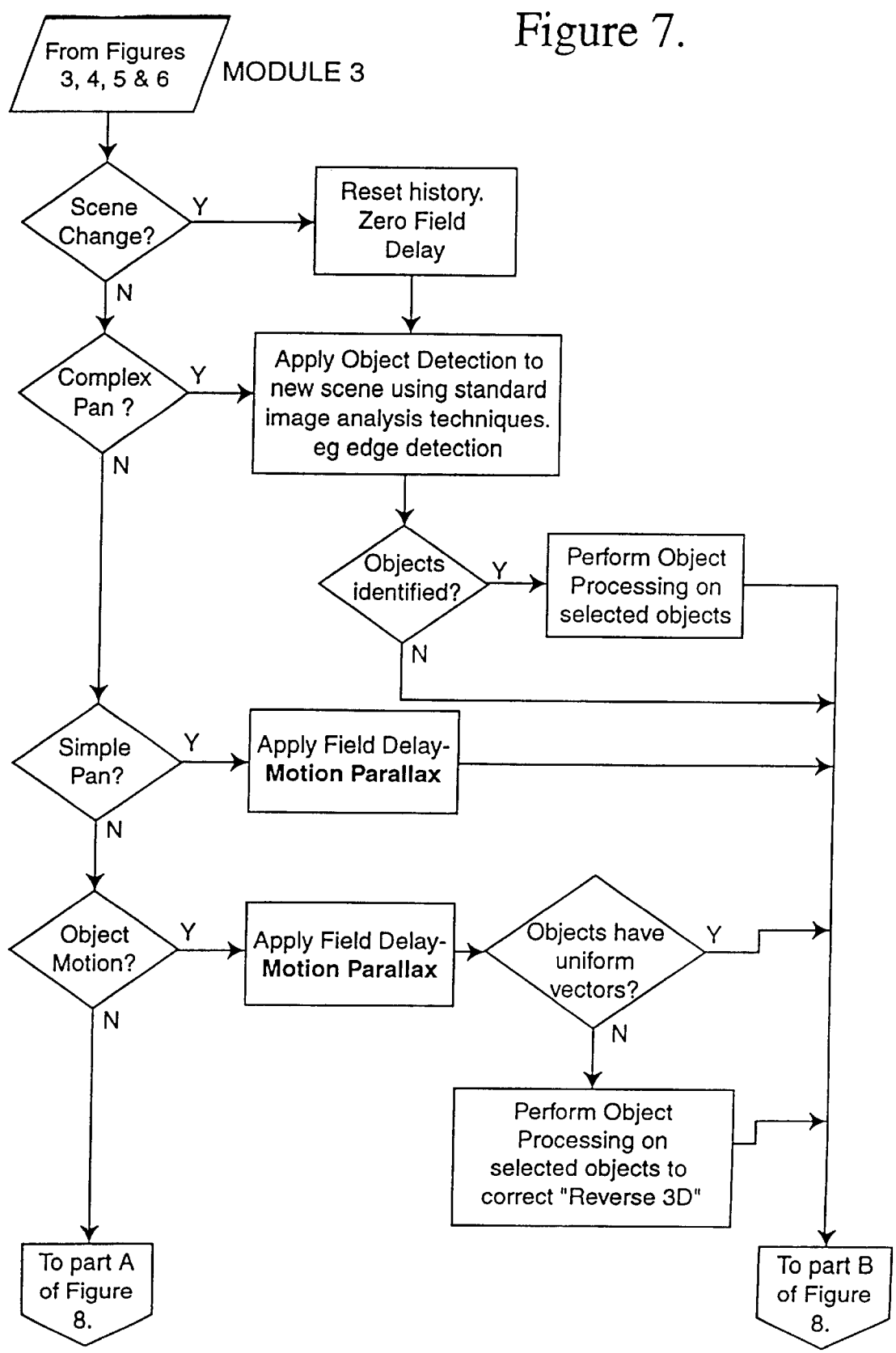
FIG. 7 shows a flow diagram of the first part of Module 3 (3D Generation).

The complete system can be operated on a single processor with all five modules being processed together or individually in realtime or non-realtime (Modules 2, 3 and 4). Modules 2 and 3 can be further segmented to suit a multitasking or multiprocessor environment, as can be seen in FIG. 2 for example.

The use of multiple processors can also be configured to the application on hand. For example, modules 1 and 2 could be handled by a first processor, and modules 3 to 5 by a second processor. If desired, the first processor of this arrangement could be used as a look-ahead processor, and the second processor could generate the stereoscopic images after a delay. Alternatively, a first processor could be used to receive realtime video, digitise the video and transfer the digitised video to a suitable digital storage device. A second processor, either on site or remotely, could then analyse the digitised image and perform the necessary tasks to display a stereoscopic image on a suitable display device.

Look-ahead processing techniques may be employed to predict trends in sequences of film or video so that the image processing modes may be more efficiently selected to optimise the overall stereoscopic effect.

The present invention is primarily concerned with the analysis of monoscopic images and conversion of the monoscopic images into stereoscopic image pairs together with the optimisation of the stereoscopic effect. In this regard the present invention is applicable to a broad range of monoscopic inputs, transmission means and viewing means. However, for completeness all five defined modules will be described herein:

Module 1—Image or Video Input

Module 1 requires that a monoscopic image source or video input is provided. This source may be provided as either a digital image source or an analogue image source which may then be digitised. These image sources may include:

1) Analogue Source
   a) Tape based—VCR/VTR or Film.
   b) Disk based—Laser Disk.
   c) Video Camera or other realtime image capture device.
   d) Computer generated images or graphics.
2) Digital Source
   a) Tape based—Typical examples are DAT, AMPEX's DCT, SONY's Digital Betacam, Panasonic's digital video formats or the new Digital Video Cassette (DVC) format using 6.5 mm tape.
   b) Disk based storage—Magneto Optical (MO) hard disk (HD), compact disk (CD), Laser Disk, CD-ROM, DAT, Digital Video Cassette (DVC) or Digital Video Disk (DVD) based data storage devices—uses JPEG, MPEG or other digital formats.
   c) Video Camera or other realtime image capture device.
   d) Computer generated images or graphics.

What is important for the conversion process of the present invention is that a monoscopic image source be provided. It is noted that a stereoscopic image source may be provided which would generally obviate the need for modules 1 to 3, however, any such stereoscopic image may be passed through an optimisation stage prior to display.

Module 2—Image Analysis

Referring now to FIGS. 3 to 8 which show flow diagrams demonstrating a preferred arrangement of the present invention.

Following reception of 2D images, digitised video or digital image data is processed on a field by field or image by image basis in realtime or non-realtime by hardware, software or by a combination of both. Firstly, the image analysis process occurs including the steps of:

1) Image compression.
2) Motion detection.
3) Object detection.
4) Motion analysis.

1) Image Compression

Compression of the image is not essential, however, for many processes and applications, compression is a practical option particularly, where the processor is not powerful enough to process a full resolution image in the time required.

Preferably the images are scaled to smaller dimensions. The scaling factor is dependent on the digital video resolution used for each image, and is usually defined by the type of image capture facility used in the digitising process.

2) Motion Detection

In a preferred embodiment each image may be analysed in blocks of pixels. A motion vector is calculated for each block by comparing blocks from one image with corresponding blocks from an adjacent image that are offset horizontally and/or vertically by up to a predetermined number of pixels, for example ±9, and recording the position that gives the minimum Mean Squared Error.

For each block, the vector and minimum and maximum Mean Square Error are recorded for later processing.

To save on processing time, vectors need not be calculated if there is no detail in the block, for example, when the block is a homogeneous colour.

Other methods for calculating the motion can be utilised, for example image subtraction. The present embodiment uses the Mean Squared Error method.

3) Object Detection

An Object is defined as a group of pixels or image elements that identify a part of an image that has common features. Those characteristics may relate to regions of similar luminance value (similar brightness), chrominance value (similar colour), motion vector (similar speed and direction of motion) or similar picture detail (similar pattern or edge).

For example a car driving past a house. The car is a region of pixels or pixel blocks that is moving at a different rate to the background. If the car stopped in front of the house then the car would be difficult to detect, and other methods may be used.

A connectivity algorithm may be used to combine the motion vectors into regions of similar motion vectors. An Object may be comprised of one or more of such regions. Other image processing algorithms, such as edge detection etc, may be used in the detection of Objects.

Once Objects are identified in an image they are preferably tagged or given an identification number. These Objects and their relevant details (for example position, size, motion vector, type, depth) are then stored in a database so that further processing may occur. If an Object is followed over a sequence of images then this is known as Object Tracking. By tracking Objects and analysing their characteristics they can be identified as being foreground or background Objects and therefore enhanced to emphasise their depth position in an image.

4) Motion Analysis

Once Objects have been detected, the Objects can be analysed to determine the overall speed and direction of motion in the image. In the preferred embodiment, this stage determines the type of motion in the image, and also provides an overall vector.

By using the Object Detection information and comparing the data to several image motion models a primary determination can be made as to the best method to convert monoscopic images to stereoscopic image pairs.

The image motion models as used in the preferred embodiment of the present invention are:

a) Scene Change.
b) Simple Pan.
c) Complex Pan.
d) Moving Object over stationary background.
e) Foreground Object over moving background.
f) No Motion.

Other motion models may be used as required.

a) Scene Change

A scene change as the name suggests is when one image has little or no commonality to a previous image or scene. It may be detected as a very large absolute difference in luminance between the two images, or a large difference in the colours of the two images.

In a preferred arrangement a scene change may be determined when the median of the differences of luminance values (0–255) between previous and current images is typically above 30. This value may vary with application but trial and error has determined that this value is appropriate for determining most scene changes.

A secondary test to determine a scene change can be when there are too many regions of motion vectors, which appears like random noise on the image and is likely due to a scene change. This may occur if there is a very large amount of motion in the image.

A third technique to detect a scene change is to analyse the top few lines of each image to detect a scene change. The top of each image changes the least.

Alternatively, when the majority of motion vector blocks have large error values the difference between the two images is too great and will therefore be considered as a scene change.

Scene Change and Field Delay

In the preferred embodiment when there is lateral motion detected in a scene the image to the trailing eye is delayed by an amount of time that is inversely proportional to the speed of the motion. For an image moving right to left the trailing eye is the left eye and for an image moving left to right the trailing eye is the right eye.

The image sequence delay (or Field Delay) to the trailing eye, may be created by temporally delaying the sequence of video fields to the trailing eye by storing them in digital form in memory. The current video field is shown to the leading eye and the delayed image to the trailing eye is selected from the stored video fields depending on the speed of the lateral motion.

Over a number of fields displayed, a history as to the change in motion and change in Field Delays to the trailing eye can be maintained. This helps in smoothing the stereoscopic effect by enabling the image processor to predict any motion trends and to react accordingly by modifying the delay so that there are no sudden changes.

If a scene change is detected the Field Delay for the preferred embodiment of the present invention is set to zero to prevent the image breaking apart and the Field Delay history is also reset. Field Delay history is preferably reset on each scene change.

b) Simple Pan

A simple pan describes a lateral motion trend over a series of images whereby the majority of analysed motion is in one direction. This will preferably also cover the situation where the majority of the scene has a consistent motion, and no stationary objects are detected in the foreground.

A simple pan can be detected as the major Object having a non zero motion vector.

The result of a simple pan is that a positive motion vector is generated if the scene is moving to the right (or panning left). In this case, the image to the right eye will be delayed. Similarly, a negative motion vector is generated if the scene is moving to the left (or panning right). In this case, the image to the left eye will be delayed.

c) Complex Pan

A complex pan differs from a simple pan in that there is significant vertical motion in the image. Therefore, in the preferred embodiment, to minimise vertical disparity between the stereoscopic image pair sequences, Field Delay is not applied and only Object Processing is used to create a stereoscopic effect. Field Delay history is stored to maintain continuity with new lateral motion.

d) Moving Object over Stationary Background

A moving object over a stationary background is simply the situation whereby the majority of a scene has no motion, and one or more moving Objects of medium size are in scene. This situation also results in a positive motion vector if the majority of Objects are moving to the right, and a negative motion vector if the majority of Objects are moving to the left. A positive motion vector produces a delay to the right eye, and a negative motion vector produces a delay to the left eye.

In the case where the motion vectors of the Objects in the scene are not consistent, for example, objects moving to the left and right in the same scene, then Contra Motion exists and Reverse 3D correction techniques may be applied.

e) Foreground Object over Moving Background

A Foreground Object over a moving background refers to the situation where a majority of the scene has motion, and an Object having a different motion is in the scene, for example a camera following a person walking. A Background Object is detected as a major Object of non-zero motion vector (That is, a panning background) behind an Object of medium size with zero or opposite motion vector to the main Object, or a major Object of zero vector in front of minor Objects of non zero vector that are spread over the entire field (That is, a large stationary object filling most of the field, but a pan is still visible behind it).

A decision should be made as to whether the foreground Object should be given priority in the generation of Motion Parallax, or whether the background should be given priority. If the background contains a large variation in depth (for example, trees), then motion vectors are assigned as if a Simple pan was occurring. If the background contains little variation in depth (for example, a wall) then a motion vector is assigned that is antiparallel or negative.

When the background contains a large variation in depth, and a motion vector is assigned to the scene as per Simple Pan methods, then the foreground object will be in Reverse 3D, and suitable correction methods should be applied.

f) No Motion

If no motion is detected such that the motion vectors are entirely zero, or alternatively the largest moving Object is considered too small, then the Field Delay will be set to zero. This situation can occur where only random or noise motion vectors are determined, or where no motion information is available, for example during a pan across a blue sky.

Module 3—3D Generation

Once the images are analysed they can then be processed to create the stereoscopic image pairs.

When viewing a real world scene both eyes see a slightly different image. This is called retinal disparity. This in turn produces stereopsis or depth perception. In other words we see stereoscopically by having each eye see a slightly different image of the same scene.

Parallax on the other hand is defined as the amount of horizontal or lateral shift between the images which is perceived by the viewer as retinal disparity. When a stereoscopic image pair is created, a three-dimensional scene is observed from two horizontally-shifted viewpoints.

The present invention utilises a number of image and object processing techniques to generate stereoscopic image pairs from monoscopic images.

These techniques include:
1) Motion Parallax.
2) Forced Parallax (Lateral Shifting).
3) Parallax Zones.
4) Image Rotation about the Y-Axis.
5) Object Processing.

1) Motion Parallax

When a scene is moving from right to left, the right eye will observe the scene first while the left eye will receive a delayed image and visa versa for a scene moving in the opposite direction. The faster the motion the less delay between the images to both eyes. This is known as motion parallax and is a major depth cue. Therefore, if there is lateral motion in a scene, by creating a delay between the images to the eyes a stereoscopic effect will be perceived.

a) Field Delay Calculation

Once the nature of the motion in an image has been analysed and an overall motion vector determined, the required Field Delay can then be calculated. Preferably, the calculated Field Delay is averaged with previous delays to filter out 'noisy' values and also to prevent the Field Delay changing too quickly.

As stated above, the faster the motion the less delay between the image to each eye. Accordingly, smaller values of Field Delay are used in scenes with large motion vectors, whereas larger delays are used in scenes with little lateral motion. That is, an inverse relationship exists in the preferred embodiment between the delay and amount of motion.

When a scene change is determined, the history of Field Delays should be reset to zero, as if no motion had occurred previously. At the first detection of motion when a non zero Field Delay is calculated whilst the history of Field Delays is still zero, the entire history of Field Delay is set to the calculated Field Delay. This enables the system to immediately display the correct Field Delay when motion is detected.

b) Field Delay Implementation

Motion Parallax can be generated in hardware and software by storing digitised images in memory. Preferably, the digitised images could be stored in a buffer and a single input pointer used with two output pointers, one for the left eye image and one for the right eye image. The leading eye's image memory pointer is maintained at or near the current input image memory pointer while the delayed eyes image memory pointer is set further down the buffer to produce a delayed output. Many images may be stored, up to 8–10 video fields is typical in video applications. The delay is dependent on the speed of the motion analysed in the image. Maximum field delay is when there is minimum motion.

2) Forced Parallax (Lateral Shifting)

Forced parallax can be created by introducing a lateral shift between:

i) An exact copy of an image and itself
ii) The two fields of a video frame
iii) Two frames of a film sequence
iv) A transformed copy of an image and its original A Negative lateral shift is produced by displacing the left image to the right and the right image to the left by the same amount (establishes a depth of field commencing from the screen plane and proceeding in front of it) and a Positive lateral shift by displacing the left image to the left and the right image to the right by the same amount (establishes a depth of field commencing from the screen plane and receding behind it).

Forced Parallax may be reduced to enhance the stereoscopic effect for a stationary object in front of a pan, where the object is 'placed' closer to the screen plane and the background is 'pushed back' from the defined object plane.

3) Parallax Zones

Because most scenes are viewed with the background at the top and the foreground at the bottom it is possible to accentuate a scene's depth by 'Veeing' the Forced Parallax. This is done by laterally shifting the top of the image more than the bottom of an image thus accentuating the front to back depth observed in a scene.

Another technique is to use a combination of Motion Parallax and Forced Parallax on different parts of the image. For example, by splitting the image vertically in half and applying different parallax shifts to each side, a scene such as looking forwards from a moving train down a railway track has the correct stereoscopic effect. Otherwise one side would always appear in Reverse 3D.

4) Image Rotation about the Y-Axis

When an object is moving towards the viewer in a real world scene, the object is rotated slightly in the view for each eye. The rotation effect is more pronounced as the object moves closer. Translating this rotation into the stereoscopic image pairs defines the effect as follows:

i) Moving towards the viewer—The left image is rotated vertically about its central axis in an anti-clockwise direction and the right image in a clockwise direction.

ii) Moving away from the viewer—The left image is rotated vertically about its central axis in a clockwise direction and the right image in an anti-clockwise direction.

Therefore, by image rotation, the perspective of objects in the image is changed slightly so that depth is perceived. When this technique is combined with Forced Parallax for certain scenes the combined effect provides very powerful stereoscopic depth cues.

5) Object Processing

Object processing is performed to further enhance the stereoscopic effect, particularly in still images, by separating the Objects and background so that these items can be processed independently. It is most effective when the objects are large in size, few in number and occupy distinct depth levels throughout the depth of field.

A database for Object Tagging and Object Tracking can be used to establish trends so that an Object can be digitally 'cut out' from its background and appropriate measures taken to enhance the stereoscopic effect. Once processing has taken place the Object is 'Pasted' back in the same position on to the background again. This can be termed the 'Cut and Paste' technique and is useful in the conversion process.

By integrating the processes of Object Tagging, Tracking, Cutting and Pasting a powerful tool is available for enabling Object Processing and Background Processing.

Another Object Processing technique is Object Layering which defines an independent depth module for each moving Object. The Object can then be placed anywhere on an image because the background fill detail has been defined when the Object was not in that position. This is not generally possible with a still Object unless the background fill-in is interpolated.

A most important issue in stereoscopic conversion is the correction of Reverse 3D and Accommodation/Convergence imbalances that cause viewer discomfort. Object Processing in the preferred embodiment allows corrections to this problem too.

a) Mesh Distortion and Morphing

This Object processing technique allows an Object to be cut and pasted onto a distorted mesh to enhance depth perception. By distorting an Object in the left eye image to the right and by distorting the same object in the right eye image to the left, thus creating Object Parallax, the Object can be made to appear much closer to a viewer when using a stereoscopic display device.

b) Object Barrelling

This technique is a specific form of Mesh Distortion and refers to a technique of cutting an Object from the image and wrapping onto a vertically positioned half barrel. This makes the Object appear to have depth by making the centre portion of the Object appear closer than the Object edges.

c) Object Edge Enhancement

By emphasising the edges of an Object there is greater differentiation between the background or other Objects in an image. The stereoscopic effect is enhanced in many applications by this technique.

d) Object Brightness Enhancement

In any image the eye is always drawn to the largest and brightest objects. By modifying an Object's luminance the Object can be emphasised more over the background, enhancing the stereoscopic effect.

e) Object rotation about Y-axis

Object rotation about the Y-axis refers to a similar process to that of image rotation about the Y-axis, except that this time the rotation occurs to the Object only. If the Object in the stereoscopic image pair is 'Cut' from its background and rotated slightly the change in perspective generated by the rotation is perceived as depth.

3D Optimisation

1) Reference Points or Borders

When using a normal TV or video monitor to display stereoscopic images the eye continually observes the edge of the monitor or screen and this is perceived as a point of reference or fixation point for all depth perception. That is, all objects are perceived at a depth behind or in front of this reference point.

If the edge of the monitor is not easily seen because of poor ambient lighting or due to its dark colour then this reference point may be lost and the eyes may continually search for a fixation point in the 3D domain. Under prolonged stereoscopic viewing this can cause eye fatigue and decreased depth perception. A front or rear projection screen display system may also suffer from the same problems.

The present invention therefore preferably also defines a common border or reference point within a viewed image. Ideally the reference plane is set at the screen level and all depth is perceived behind this level. This has the advantage of enhancing the stereoscopic effect in many scenes.

This reference point can be a simple video border or reference graphic and, for example, may be of the following types:

i) A simple coloured video border around the perimeter of the image.

ii) A complex coloured video border consisting of two or more concentric borders that may have opaque or transparent sections between them. For example, a 2–3 cm wide mesh border or a wide outer border with two thin inner borders.

iii) A partial border that may occupy any one edge, or any two horizontal or vertical edges.

iv) A LOGO or other graphic located at some point within the image.

v) A picture within a picture.

vi) A combination of any of the above.

What is essential in this embodiment is that the eyes of the viewer be provided with a reference point by which the depth of the objects in the image can be perceived.

If a border or graphic is added at the 3D Generation level then it may be specified to provide a reference point at a particular depth by creating left and right borders that are laterally shifted from each other. This enables the reference or fixation point to be shifted in space to a point somewhere behind or in front of the screen level. Borders or graphics defined with no parallax for the left and right eyes will be perceived at the screen level. This is the preferred mode of the present invention.

A image border or reference graphic may be inserted at the 3D Generation point or it may be defined externally and genlocked onto the stereoscopic image output for display. Such an image border or reference graphic may be black, white or coloured, plain or patterned, opaque, translucent or transparent to the image background, or it may be static or dynamic. Whilst a static border is appropriate in most instances, in some circumstances a moving or dynamic border may be used for motion enhancement.

2) Parallax Adjustment—Depth Sensitivity Control

Stereoscopic images viewed through a stereoscopic display device automatically define a depth range (called depth acuity) which can be increased or decreased by modifying the type and amount of parallax applied to the image or objects. It has been found that different viewers have varying stereoscopic viewing comfort levels based on the depth range or amount of stereopsis defined by stereoscopic image pairs. That is, while some viewers prefer a pronounced stereoscopic effect with a greater depth range, others prefer an image with minimal depth.

To adjust the level of depth sensitivity and viewing comfort many techniques may be used, namely:

i) Varying the amount of Motion Parallax by varying the Field Delay ii) Varying the amount of Forced Parallax to an image iii) Varying the amount of Parallax applied to objects By reducing the maximum level of Parallax the depth range can be reduced, improving the viewing comfort for those with perception faculties having greater sensitivity to sterescopy.

3) Parallax Smoothing

Parallax Smoothing is the process of maintaining the total amount of Parallax (Motion Parallax plus Forced Parallax) as a continuous function. Changes in Field Delay for specific motion types, that is, Simple Pan and Foreground Object Motion, cause discontinuities in the amount of Motion Parallax produced, which are seen as "jumps" in the stereoscopic images by the viewer. Discontinuities only occur in the image produced for the trailing eye, as the leading eye is presented with an undelayed image. These discontinuities can be compensated for by adjusting the Forced Parallax or Object Parallax in an equal and opposite direction for the trailing eye, thus maintaining a continuous total parallax.

The Forced Parallax or Object Parallax is then adjusted smoothly back to its normal value, ready for the next change in Field Delay. The adjustments made to Forced Parallax by Parallax Smoothing are a function of Field Delay change, motion type and motion vector. To implement Parallax Smoothing, the Forced Parallax for the left and right eye images should be independently set.

4) Parallax Modulation

The Forced Parallax technique of creating a stereoscopic effect can also be used to moderate the amount of stereopsis detected by the viewer. This is done by varying the Forced Parallax setting between a minimum and maximum limit over a short time such that the perceived depth of an object or image varies over time. Ideally the Forced Parallax is modulated between its minimum and maximum settings every 0.5 to 1 second. This enables a viewer to accommodate to their level of stereoscopic sensitivity.

5) Movement Synthesis

By creating pseudo movement, by randomly moving the background in small undetectable increments, the perceived depth of foreground objects is emphasised. Foreground objects are 'Cut' from the background, the background is altered pseudo-randomly by one of the techniques below and then the foreground object is 'Pasted' back on to the background ready for display. Any of the following techniques may be used:

i) Luminance values varied on a pseudo-random basis ii) Chrominance values varied on a pseudo-random basis iii) Adding pseudo-random noise to the background to create movement 6) Reverse 3D Analysis and Correction Reverse 3D occurs, when the depth order of Objects created by Parallax is perceived to be different to that corresponding to the depth order in the real world. This generally leads to viewer discomfort and should be corrected. When converting monoscopic images to stereoscopic image pairs Reverse 3D may be produced by:

i) Contra motion, objects moving left and right in the same image.

ii) Objects and background moving in different directions.

iii) Many objects moving at varying speeds

Reverse 3D is corrected by analysing the nature of the motion of the objects in an image and then manipulating each Object individually using mesh distortion techniques so that the Object Parallax matches with the expected visual perception norms.

7) Miscellaneous Techniques

By modifying the perspective of an object within an image and by enhancing many of the minor depth cues the stereoscopic effect can be emphasised. The techniques below all operate using the 'Cut and Paste' technique. That is, a foreground object is 'Cut', enhanced and then 'Pasted' back on to the background.

a) Shadows—Shading gives an object perspective.

b) Foreground/Background—By defocussing the background, through blurring or fogging, a foreground object may be emphasised, while defocussing the foreground object the background depth may be emphasised c) Edge Enhancement—Edges help to differentiate an object from its background.

d) Texture Mapping—Helps to differentiate the object from the background.

Module 4—3D Media (Transmission & Storage)

As for module 1, modules 4 and 5 are not essential to the present invention. Module 4 provides for the transmission and/or storage of the stereoscopic images. The transmission means can be adapted for a particular application. For example the following can be employed:

1) Local Transmission—can be via coax cable

2) Network TV Transmission—can be via i) Cable ii) Satellite iii) Terrestrial

3) Digital Network—INTERNET, etc

4) Stereoscopic (3D) Image Storage

An image storage means may be used for storage of the image data for later transmission or display and may include:

i) Analogue Storage—Video Tape, Film, etc ii) Digital Storage—Laser Disk, Hard Disk, CD-ROM, Magneto Optical Disk, DAT, Digital Video Cassette (DVC), DVD.

Module 5—3D Display

As for the transmission means the display means can be dependent on the application requirements and can include:

1) Set-top Box

A set-top box by definition is a small box of electronics that receives, decodes, provides accessories interfaces and finally has outputs to suit the application. It may incorporate the following:

a) Video or RF receiver.

b) Stereoscopic (3D) decoder to provide separate left and right image outputs to Head Mounted Devices or other stereoscopic displays where separate video channels are required.

c) Resolution Enhancement—Line Doubling/Pixel Interpolation.

d) Shutter or Sequential Glasses Synchronisation.

e) Stereoscopic depth sensitivity control circuitry.

f) Accessories interface—remote control with features such as a 2D/3D switch and Depth control.

g) Audio interface—audio output, headphone connection.

h) Access channel decoding—cable and pay TV applications.

i) Video or RF outputs.

2) Stereoscopic Displays

Use special glasses or head gear to provide separate images to the left and right eyes including:

a) Polarising glasses—Linear and Circular polarisers.

b) Anaglyphic glasses—Coloured lenses—red/green, etc.

c) LCD Shutter glasses.

d) Colour Sequential Glasses.

e) Head Mounted Devices (HMD)—Head gear fitted with two miniature video monitors (one for each eye), VR headsets.

3) Autostereoscopic Displays
   a) Video Projector/Retroreflective screen based display systems.
   b) Volumetric display systems.
   c) Lenticular lens based display systems.
   d) Holographic Optical Element (HOE) based display systems.

PREFERRED EMBODIMENT

In summary, the present invention provides in a preferred embodiment a system that is capable of inputting monoscopic image sequences in a digital format, or in an analogue format in which case an analogue to digital conversion process is involved. This image data is then subjected to a method of image analysis whereby the monoscopic images are compressed, if this is required for the particular application.

By comparing blocks of pixels in an image, with corresponding blocks in an adjacent image, and by obtaining the minimum Mean Square Error for each block, motion within the image can be determined.

Following motion detection, regions of an image are identified for similar characteristics, such as, image brightness, colour, motion, pattern and edge continuity. The data is then subjected to motion analysis in order to determine the nature of the motion in the image. This motion analysis takes the form of determining the direction, speed, type, depth and position of any motion in the image. This motion is then categorised into a number of categories including whether the motion is a complete scene change, a simple pan, a complex pan, an object moving on a stationary background, a stationary object in front of a moving background, or whether there is no motion at all. Further actions are then determined based on these categories to convert the monoscopic images into stereoscopic image pairs suitable for viewing on an appropriate stereoscopic display device.

In the preferred embodiment, once the monoscopic images are analysed, if a scene change or a complex pan is detected then no further analysis of that particular scene is required, rather the Field Delay and Field Delay history are both reset to zero. An object detection process is then applied to the new scene in order to try and identify objects within that scene. Once these objects are identified, then object processing takes place. If no objects are identified, then the image is passed on for further processing using forced parallax and 3D optimisation.

If the motion categorised during the image analysis is not a scene change, then further analysis of that scene is required. If further analysis of that scene results in the motion being categorised as a simple pan, then it is necessary to apply a Field Delay in accordance with the principles of motion parallax. It is then passed on for further processing. If the motion is not categorised as a simple pan, but rather an object in motion on a stationary background, then again we have to apply a Field Delay in accordance with the principles of motion parallax. In this regard, once the motion parallax has been applied, it is necessary to consider whether the objects all have a uniform direction. If the objects do move in a uniform direction, then it is passed on for further processing at a later stage. If the objects do not have a uniform direction, then it is necessary to perform further object processing on selected objects within that scene to correct for the Reverse 3D effect. This can be achieved through using mesh distortion and morphing techniques.

If the motion is categorised as being a stationary object on a moving background, it is then necessary to consider whether the background has a large variation in depth. If it does not, then we apply a Field Delay with the object having priority using the principles of motion parallax. However, if the background does have large variation in depth, then we apply a Field Delay with the background having priority as opposed to the object, again using the principles of motion parallax. In this case, it is then also necessary to perform further object processing on the foreground object to correct for the Reverse 3D effect prior to being passed on for further processing.

If no motion is detected, then we next consider whether an object in the scene was known from any previous motion. If this is so, then we perform object processing on that selected object. If not, then we apply an object detection process to that particular scene in order to attempt to identify any objects in it. If an object is identified, then we perform object processing on that particular object, if not, Forced Parallax and 3D Optimisation is performed.

Where object processing is required, objects are identified, tagged and tracked, and then processed by using techniques of mesh distortion and morphing, object baralleling, edge enhancement, brightness modification and object rotation.

In all cases, once the motion has been categorised and the primary techniques to convert to stereoscopic images have been applied, then a further amount of parallax or lateral shifting called forced parallax is applied to the image. It is noted that in the preferred embodiment, forced parallax is applied to every image, not just for depth smoothing purposes but to provide an underlying stereoscopic effect that all images are seen as having depth behind or in front of the stereoscopic display device's reference plane, generally the front of the monitor screen. The advantages of applying forced parallax are that the system is better able to cope with changes in the category of the motion detected without causing sudden changes in the viewers depth perception.

Once the forced parallax has been applied to the image, the image is then passed for 3D Optimisation. Again, this is not necessary in order to see a stereoscopic image, however the optimisation does enhance the image's depth perception by the viewer. The 3D Optimisation can take in a number of forms including the addition of reference points or borders, parallax modulation, parallax smoothing and parallax adjustment for altering the depth sensitivity of any particular viewer. The image can also be optimised by modifying luminance or chrominance values pseudo randomly so that background motion behind foreground objects can be observed so that the depth perception is enhanced. It is also possible to analyse for Reverse 3D so that a viewers eye-strain is minimised. Further techniques such as shadowing, foreground and background fogging or blurring and edge enhancement of the image can also be carried out in this stage.

Once the image has been optimised it is then transmitted to the appropriate display device. This transmission can take a number of forms including cable, co-axial, satellite or any other form of transmitting the signal from one point to another. It is also possible that,the image could be stored prior to being sent to a display device. The display device can take on a number of forms, and only need be appropriate for the application in hand, for example, it is possible to use existing video monitors with a set top device in order to separate the left and right images, increase the scan rate and to synchronise viewing glasses. Alternatively, dedicated stereoscopic displays can be used which incorporate the use of glasses or head gear to provide the stereoscopic images or alternatively, an auto-stereoscopic display device can be used. It is envisaged that the present invention will have application in theatres, cinemas, video arcades, cable or network TV, in the education area, particularly in the multimedia industry and in many other areas such as theme parks and other entertainment applications.

The claims defining the invention are as follows:

1. A method for converting monoscopic images for viewing in three dimensions comprising:

receiving monoscopic images;

analyzing said monoscopic images to determine characteristics of the images and to determine if there is any continuity between successive first and second of said monoscopic images;

processing said monoscopic images based on the determined image characteristics and/or the determination if there is any continuity between the first and second monoscopic images; and outputting the processed images to suitable storage and/or stereoscopic display systems, wherein said analyzing further includes determining the motion of said monoscopic images by:

dividing each image into a plurality of blocks, wherein corresponding blocks on an adjacent image are offset horizontally and/or vertically; and comparing each said block with said corresponding blocks to find a minimum mean square error and thereby the motion of the block.

2. The method as claimed in claim 1, wherein said processing includes at least one of the following methods:

motion parallax, forced parallax, parallax zones, image rotation and/or object processing.

3. The method as claimed in claim 1, wherein said monoscopic image is digitized before any said analyzing or said processing is performed.

4. The method as claimed in claim 1, further comprising compressing said monoscopic image prior to said analyzing.

5. The method as claimed in claim 1, further comprising scaling said monoscopic image prior to said analyzing.

6. The method as claimed in claim 5, wherein said scaling includes scaling said monoscopic image by a scaling factor that depends on a digital video resolution of each image.

7. The method as claimed in claim 1, wherein said analyzing includes analyzing successive first and second images for continuity before determining the image characteristics.

8. The method as claimed in claim 7, where said analyzing successive first and second images includes comparing median luminance values between the successive first and second images to determine continuity.

9. The method as claimed in claim 8, wherein no continuity is assumed when a difference in the median luminance values exceeds 30.

10. The method as claimed in claim 7, wherein said analyzing successive first and second images includes comparing the top few lines of the successive images to assist in determining continuity.

11. The method as claimed in claim 7, wherein where no continuity is determined said processing includes introducing a field delay to one eye such that the image that lacks continuity is viewed by one eye of a viewer prior to being viewed by the other eye of the viewer.

12. The method as claimed in claim 1, wherein said analyzing includes identifying objects within the monoscopic images to assist said processing.

13. The method as claimed in claim 12, wherein said identifying includes comparing luminance values, chrominance values, motion vectors and/or picture details of adjacent pixels or groups of pixels.

14. The method as claimed in claim 1, wherein said analyzing includes determining the motion of objects within the monoscopic images to assist said processing.

15. The method as claimed in claim 14, wherein the motion of the monoscopic images and/or said objects is categorized into one of a predetermined range of motion categories.

16. The method as claimed in claim 14, wherein a motion vector is defined for each image based on a comparison of the motion detected with predefined motion categories ranging from no motion to a complete scene change.

17. The method as claimed in claim 1, wherein the motion categories include scene change, simple pan, complex pan, moving object, moving background, and no motion.

18. The method as claimed in claim 1, wherein any said block without details is not compared with said corresponding blocks.

19. The method as claimed in claim 7, wherein no continuity is assumed when said comparing of the majority of blocks with said corresponding blocks results in large error values.

20. The method as claimed in claim 1, wherein said processing of each image includes using motion parallax by introducing a field delay such that one eye of a viewer views the image before the other eye of the viewer.

21. The method as claimed in claim 20, wherein the amount of motion is inversely proportional to the field delay.

22. The method as claimed in claim 20, further including storing each field delay, and averaging the field delay for each new image with previous field delays.

23. The method as claimed in claim 22, further including deleting each stored field delay when a non-continuity is detected.

24. The method as claimed in claim 1, wherein said processing of each image includes using forced parallax by introducing a lateral shift through displacement of left and right eye images.

25. The method as claimed in claim 1, wherein said processing of each image includes using parallax zones by introducing a greater lateral shift to one portion of the image.

26. The method as claimed in claim 25, wherein a top portion of the image is shifted laterally a greater amount than a bottom portion of the image.

27. The method as claimed in claim 25, further including applying a different parallax shift to a left side of the image as opposed to a right side of the image.

28. The method as claimed in claim 1, wherein said processing of each image includes using a combination of forced parallax and motion parallax on various parts of the image.

29. The method as claimed in claim 1, wherein said processing of each image includes rotating left and right eye images about the y axis an equal amount in an opposite direction.

30. The method as claimed in claim 1, wherein said processing of each image includes using at least one of the following object processing techniques:

mesh distortion and morphing; object barrelling; object edge enhancement; object brightness enhancement; and/or object rotation.

31. The method as claimed in claim 1, further including processing each processed image by applying a forced parallax to the processed image.

32. The method as claimed in claim 31, wherein the degree of forced parallax is determined by the amount of parallax added during said processing of each image, such that the total parallax added during said processing of each processed image and the forced parallax, is substantially equal to the total parallax of adjacent images.

33. The method as claimed in claim 31, wherein the degree of the forced parallax is modulated between predetermined minimum and maximum settings over a predetermined time frame.

34. The method as claimed in claim 1, further including optimizing to further enhance the processed images prior to said outputting of the processed images to the stereoscopic display and/or storage systems.

35. The method as claimed in claim 1, further including adding a reference point to the processed image.

36. The method as claimed in claim 35, wherein the reference point is at least one of:
   a border around the perimeter of the processed image;
   a plurality of concentric borders;
   a partial border;
   a logo; and/or
   a picture.

37. The method as claimed in claim 1, wherein said processing includes adding an amount of depth to the monoscopic images, the amount being adjustable in response to a viewer's preference.

38. The method as claimed in claim 1, wherein said processing includes randomly moving the background of each image in increments that are not consciously detectable by a viewer.

39. The method as claimed in claim 1, further including testing each image for reverse 3D and manipulating objects individually in each image to compensate for any reverse 3D found during said testing.

40. The method as claimed in claim 1, further including cut and paste techniques to further emphasize a stereoscopic effect.

41. An image conversion system for converting monoscopic images for viewing in three dimensions including:
   an input means adapted to receive monoscopic images;
   a preliminary analysis means to determine if there is any continuity between a first image and a second image in a sequence of the monoscopic images;
   a secondary analysis means for receiving the monoscopic images which have a continuity, and analyzing the monoscopic images to determine at least one of the speed and direction of motion, or the depth, size and position of objects, wherein analyzing of said monoscopic images to determine the motion includes:
      dividing each image into a plurality of blocks, wherein corresponding blocks on an adjacent image are offset horizontally and/or vertically, and
      comparing each said block with said corresponding blocks to find a minimum mean square error and thereby the motion of the block;
   a first processing means for processing the monoscopic images based on data received from the preliminary analysis means and/or the secondary analysis means.

42. The image conversion system as claimed in claim 41 further including a transmission means adapted to transfer the processed images to a stereoscopic display system or a storage system.

43. The image conversion system as claimed in claim 41, wherein said first processing means processes the monoscopic images by using at least one of motion parallax, forced parallax, parallax zones, image rotation or object processing.

44. The image conversion system as claimed in claim 41, further including a second processing means adapted to process the images received from said first processing means.

45. The image conversion system as claimed in claim 44, wherein said second processing means uses forced parallax to process each image.

46. The image conversion system as claimed in claim 41, further including a second processing means adapted to optionally enhance the images prior to transmitting the images to a stereoscopic display device.

47. The image conversion system as claimed in claim 46, wherein said second processing means enhances the images by using at least one of reference points, parallax adjustment, parallax smoothing, parallax modulation, movement synthesis, reverse 3D correction or cut and paste techniques.

48. The system as claimed in claim 41, wherein said input means is further adapted to digitize the monoscopic images.

49. The system as claimed in claim 41, further including a compression means adapted to compress the monoscopic images prior to analysis by said preliminary analysis means.

50. The system as claimed in claim 41, further including a scaling means adapted to scale each monoscopic image prior to analysis by said preliminary analysis means.

51. The system as claimed in claim 50, wherein the scaling factor by which each monoscopic image is scaled depends on a digital video resolution of each monoscopic image.

52. The system as claimed in claim 41, wherein said preliminary analysis means is adapted to determine objects within said monoscopic images.

53. The system as claimed in claim 41, wherein said preliminary analysis means is adapted to determine the motion of the monoscopic images and/or the motion of objects within the monoscopic images.

54. The system as claimed in claim 53, wherein said preliminary analysis means is adapted to categorize the motion into one of a predetermined range of motion categories.

55. The system as claimed in claim 54, wherein the motion categories include at least one of scene change, simple pan, complex pan, moving object, moving background, and no motion.

56. The system as claimed in claim 41, further including means adapted to control the level of depth added to the monoscopic images.

57. The system as claimed in claim 41, further including means adapted to add a reference point to each processed image.

58. The system as claimed in claim 41, further including means for optimizing the processed image to further improve a stereoscopic effect.

59. A system for converting monoscopic images for viewing in three dimensions including:
   a first module adapted to receive a monoscopic image;
   a second module adapted to receive the monoscopic image and analyze the monoscopic image to create image data, wherein analyzing the monoscopic image includes determining the motion of a plurality of monoscopic images by:
      dividing each monoscopic image into a plurality of blocks, wherein corresponding blocks on an adjacent image are offset horizontally and/or vertically, and comparing each said block with said corresponding blocks to find a minimum mean square error and thereby the motion of the block;

a third module adapted to create stereoscopic image pairs from the monoscopic image using at least one predetermined technique selected as a function of the image data;

a fourth module adapted to transfer the stereoscopic image pairs; and a fifth module including a stereoscopic display means adapted to receive the stereoscopic pairs transferred by said fourth module.

60. The system as claimed in claim 59, wherein said first module is further adapted to convert an analog monoscopic image into a digital monoscopic image.

61. The system as claimed in claim 59, wherein said second module is adapted to detect objects in a scene and to determine to the speed and direction of motion of the detected objects.

62. The system as claimed in claim 59, wherein the monoscopic image is compressed prior to said second module analyzing the monoscopic image to create image data.

63. The system as claimed in claim 59, wherein the third module further includes an optimization stage to further enhance the stereoscopic image pairs.

64. The system as claimed in claim 59, wherein operation of said system is adapted to be suspended for later processing by any of said first through fifth modules.

65. The method as claimed in claim 59, wherein the fourth module is adapted store the stereoscopic image pairs and transfer the stereoscopic image pairs at a later time.

* * * * *